Aug. 28, 1923.  1,466,346
H. F. SHEPHERD
HOT POT FOR EXPLOSIVE ENGINES AND METHOD OF FORMING THE SAME
Filed Oct. 6, 1920  2 Sheets-Sheet 1

Patented Aug. 28, 1923.

1,466,346

UNITED STATES PATENT OFFICE.

HAROLD F. SHEPHERD, OF GROVE CITY, PENNSYLVANIA, ASSIGNOR TO THE BESSEMER GAS ENGINE COMPANY, OF GROVE CITY, PENNSYLVANIA, A CORPORATION OF PENNSYLVANIA.

HOT POT FOR EXPLOSIVE ENGINES AND METHOD OF FORMING THE SAME.

Application filed October 6, 1920. Serial No. 415,203.

*To all whom it may concern:*

Be it known that I, HAROLD F. SHEPHERD, a citizen of the United States, residing at Grove City, in the county of Mercer and State of Pennsylvania, have invented new and useful Improvements in a Hot Pot for Explosive Engines and Methods of Forming the Same, of which the following is a specification.

I have in Patent #1,258,156, issued to me Mar. 5, 1918, disclosed a hot plate apparatus which involves a hot pot in which there is arranged a liquid vaporizing at the desired temperature of the hot plate, the vapor of the liquid being condensed by a cold wall on the pot so as to dissipate the excess heat of the hot plate and thus maintain the hot plate at a constant temperature.

I have found mercury to be a desirable liquid for this purpose because it has a vaporizing temperature which is desirable for most forms of oil. It is very important where this hot plate is used on explosive engines or devices which go into general use to have it so formed that it will be permanent in its character and it is also desirable to have the vapor readily condensed so that the liquid may not be wholly vaporized and where the condensing takes place promptly a smaller amount of liquid may be used. Further if the condensation is not adequate there is a difference in pressure through the formation of the vapor and this varies the vaporizing temperature. It has been found that the inclusion of air in the hot pot interferes very materially with the condensing of the vapors because this air being somewhat lighter than the vapors of mercury forms an insulating coating over the condensing surfaces. It is desirable, therefore, to exclude the air from the hot pot and so seal the hot pot as to prevent the escape of the mercury vapors or the ingress of air.

In carrying out my method I place the desired quantity of mercury in the hot pot, heat it to a vaporizing temperature, allow the vapor to accumulate until the mercury vapors show as escaping, and then seal the pot, the mercury vapors being slightly heavier than the air will first exclude the air so that the exhaustion of the air may be readily accomplished.

The invention is illustrated in the accompanying drawings as follows:—

Figure 1:
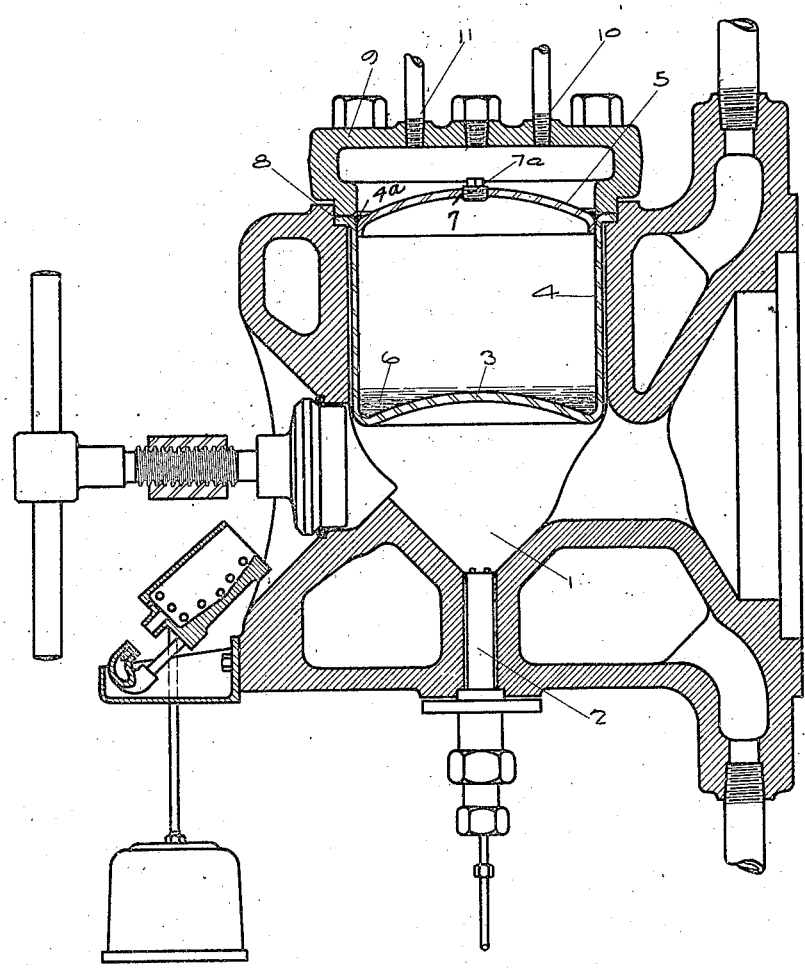
Fig. 1 shows a central section of the combustion chamber of an explosive engine with a hot pot in place.
Figure 2:
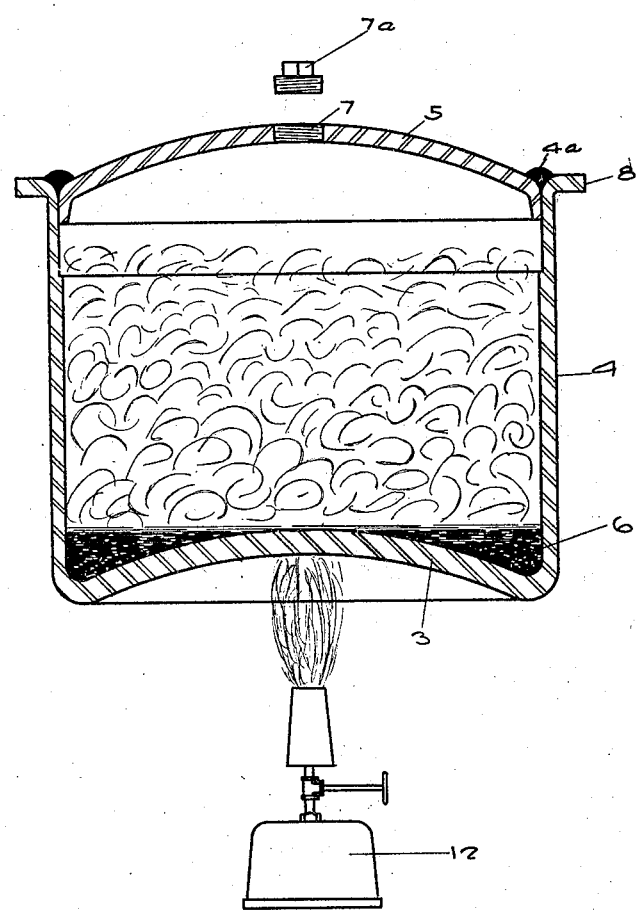
Fig. 2 shows a hot pot with a heating apparatus for vaporizing mercury to expel the air.

1 marks the combustion chamber of an explosive engine, 2 the fuel injector, 3 a hot plate forming the bottom of the hot pot 4, 5 the cover of the hot pot, the cover forming the condensing surface, and 6 a mercury bath arranged in the hot pot. The hot pot is formed with the flanges 8 which are secured within the walls of the engine above the combustion chamber by a plate 9 which forms a water jacket for cooling the cover or condensing surface 5, the jacket having the inlet 10 and outlet 11 for circulating a cooling medium such as water. In forming the hot pot the cover is placed in the pot proper and the joint is sealed by welding as indicated at 4ª. A torch 12 is applied to the bottom of the pot and the temperature raised to a point that will vaporize the mercury. The mercury vapor being heavier than air in rising expels the air from the pot through the opening 7 in the cover. As soon as the air is completely expelled the mercury vapor begins to escape at the opening 7, thus indicating the complete expulsion of air at which moment the plug 7ª is put in place, thus completely sealing the pot. The pot then, therefore, is free from air and consequently the condensing surfaces can be directly reached by the vapor as it rises from the liquid mercury and the condensation is, therefore, prompt and so rapid as to prevent any building up of pressure in the pot in any ordinary use. This rapid condensation also permits of the use of but a small amount of mercury in covering the hot plate. By forming the pot of a solid bottom portion and a flange cover which is extended into this pot a ready means of forming a sealing connection between the cover and the pot is afforded.

This flange cover extending into the pot forms the necessary groove for holding the welding metal so that the welding is readily accomplished.

What I claim as new is:—

1. In a hot plate apparatus, the combination of a hot pot, one fall of which forms a hot plate, said pot having the air exhausted therefrom and sealed; and a liquid in the pot over the plate vaporizing at a pre-determined temperature.

2. In a hot plate apparatus, the combination of a hot pot, one wall of which forms a hot plate, said pot having the air exhausted therefrom and sealed; a liquid in the pot over the plate vaporizing at a pre-determined temperature; and a condenser for the vapor from the liquid.

3. In a hot plate apparatus, the combination of a hot pot, one wall of which forms a hot plate, said pot having the air exhausted therefrom and sealed; a liquid in the pot over the plate vaporizing at a pre-determined temperature; and means for cooling the top of the pot.

4. In a hot plate apparatus, the combination of a hot pot, one wall of which forms a hot plate, said pot having the air exhausted therefrom and sealed; and mercury in the pot over the plate vaporizing at a pre-determined temperature.

5. In a hot plate apparatus the combination of a hot pot, the bottom of which forms a hot plate; a cover having a flange extending downwardly within the walls of the pot and forming a recess between the cover and the wall of the pot; and a welding metal filled in the recess and sealing the cover with the walls of the pot.

In testimony whereof I have hereunto set my hand.

HAROLD F. SHEPHERD.